United States Patent
Seo et al.

(10) Patent No.: US 11,228,665 B2
(45) Date of Patent: Jan. 18, 2022

(54) SERVER, ELECTRONIC DEVICE AND DATA MANAGEMENT METHOD

(71) Applicant: Samsung Electronics Co., Ltd., Gyeonggi-do (KR)

(72) Inventors: Young-Joon Seo, Gyeonggi-do (KR); Seung-Min Yu, Gyeonggi-do (KR); Min-Woo Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 16/468,373

(22) PCT Filed: Dec. 11, 2017

(86) PCT No.: PCT/KR2017/014466
§ 371 (c)(1),
(2) Date: Jun. 11, 2019

(87) PCT Pub. No.: WO2018/110916
PCT Pub. Date: Jun. 21, 2018

(65) Prior Publication Data
US 2020/0195754 A1    Jun. 18, 2020

(30) Foreign Application Priority Data
Dec. 15, 2016    (KR) .................. 10-2016-0172020

(51) Int. Cl.
*H04L 29/06* (2006.01)
*G06F 16/23* (2019.01)
(Continued)

(52) U.S. Cl.
CPC .......... *H04L 67/42* (2013.01); *G06F 16/1748* (2019.01); *G06F 16/2379* (2019.01); *H04L 67/2842* (2013.01); *G06Q 50/01* (2013.01)

(58) Field of Classification Search
CPC ......... H04L 67/02; H04L 67/12; H04L 67/18; H04L 67/42; H04L 67/2842; H04L 67/1002; H04L 67/1097; H04L 12/2803; H04L 67/2852; H04L 29/06; H04L 29/08; G06F 3/2379; G06F 3/24552; G06F 16/95; G06F 16/2379; G06F 16/9537;
(Continued)

(56) References Cited

U.S. PATENT DOCUMENTS 7,574,706 B2    8/2009  Meulemans et al.
9,317,470 B1    4/2016  Raley et al.
(Continued)

FOREIGN PATENT DOCUMENTS

KR    10-2006-0114618 A    11/2006
KR    10-2014-0100501 A    8/2014

*Primary Examiner* — James N Fiorillo
(74) *Attorney, Agent, or Firm* — Cha & Reiter, LLC

(57) ABSTRACT

A server for managing data, according to various embodiments, may comprise: communication circuitry for receiving a data request from at least one electronic device; a cache for storing a plurality of update data according to an update time; and a processor for, when the data request is received from the electronic device, searching the cache for update data for a first period starting from a previous data request time to the time of receiving the data request, and transmitting at least one updated data of the first period to the electronic device.

16 Claims, 10 Drawing Sheets

(51) Int. Cl.
*H04L 29/08* (2006.01)
*G06F 16/174* (2019.01)
*G06Q 50/00* (2012.01)

(58) Field of Classification Search
CPC ............. G06F 16/9574; G06F 12/0802; G06F 12/0866; G06F 3/0601; G06F 3/0642; G06F 12/12; G06F 16/23; G06F 16/174; G06F 16/1748; G06Q 50/01; G06Q 50/00; H04W 4/02; G05B 19/4185; A63F 13/30
USPC ......................................................... 709/203
See application file for complete search history.

(56) References Cited

U.S. PATENT DOCUMENTS

| | | | | |
|---|---|---|---|---|
| 9,928,178 | B1* | 3/2018 | Solapurkar | H04L 67/2842 |
| 10,225,365 | B1* | 3/2019 | Hotchkies | H04L 67/2842 |
| 10,650,003 | B1* | 5/2020 | Rubin | G06F 16/2255 |
| 11,032,394 | B1* | 6/2021 | Teague | H04L 67/325 |
| 2002/0078174 | A1* | 6/2002 | Sim | G06F 16/182 |
| | | | | 709/219 |
| 2002/0091712 | A1* | 7/2002 | Martin | G06F 16/24552 |
| 2003/0182307 | A1* | 9/2003 | Chen | G06F 16/24552 |
| 2005/0193083 | A1* | 9/2005 | Han | H04L 69/04 |
| | | | | 709/213 |
| 2006/0179123 | A1* | 8/2006 | Smith | G06F 16/9574 |
| | | | | 709/218 |
| 2010/0174863 | A1* | 7/2010 | Cooper | G06F 16/27 |
| | | | | 711/113 |
| 2013/0013729 | A1* | 1/2013 | Bennett | G06F 16/9574 |
| | | | | 709/217 |
| 2013/0085988 | A1* | 4/2013 | Hiraguchi | G06F 16/2365 |
| | | | | 707/609 |
| 2014/0317084 | A1* | 10/2014 | Chaudhry | G06F 16/24552 |
| | | | | 707/713 |
| 2014/0366012 | A1 | 12/2014 | Jamadagni et al. | |
| 2016/0006787 | A1* | 1/2016 | Wang | G06F 16/972 |
| | | | | 709/203 |
| 2016/0110403 | A1* | 4/2016 | Lomet | G06F 16/2255 |
| | | | | 707/695 |
| 2016/0165077 | A1* | 6/2016 | Shibata | G06F 3/1205 |
| | | | | 358/1.15 |
| 2016/0198014 | A1* | 7/2016 | Tiger | H04L 67/22 |
| | | | | 709/213 |
| 2017/0147671 | A1* | 5/2017 | Bensberg | G06F 16/24552 |
| 2017/0169800 | A1* | 6/2017 | Greco | G06F 3/04845 |
| 2017/0208077 | A1* | 7/2017 | Freedman | H04L 41/20 |
| 2018/0018270 | A1* | 1/2018 | Kilaru | G06F 16/1748 |
| 2018/0137139 | A1* | 5/2018 | Bangalore | G06F 16/172 |
| 2019/0034550 | A1* | 1/2019 | Wang | G06F 16/00 |
| 2019/0268433 | A1* | 8/2019 | Brisebois | H04L 65/4084 |
| 2020/0259927 | A1* | 8/2020 | Shribman | H04L 67/06 |

* cited by examiner

SERVER, ELECTRONIC DEVICE AND DATA MANAGEMENT METHOD

CROSS-REFERENCE TO RELATED APPLICATION(S)

This application is a National Phase Entry of PCT International Application No. PCT/KR2017/014466, which was filed on Dec. 11, 2017 and claims priority under 35 U.S.C. § 119 of Korean Patent Application No. 10-2016-0172020, filed on Dec. 15, 2016, in the Korean Intellectual Property Office the disclosure of which is incorporated herein by reference in its entirety.

BACKGROUND

1. Field

The disclosure generally relates to a server, an electronic device, and a method of managing data.

2. Description of Related Art

Various types of electronic devices such as smartphones include various applications including Social Networking Service (SNS), music reproduction, and game applications. The applications may be basically installed during manufacturing, or a new function application may be downloaded through a mobile content (software) store (for example, an application store or app store) and additionally installed according to a user's need.

As online mobile content stores, through which applications can be freely purchased and sold, have recently been activated, anyone who desires applications can freely search for or download applications.

In order to search for and downlink applications, an electronic device of a user should communicate with a server, and the communication therebetween may be referred to as communication between a server and a client or communication between a master and a slave. In addition to the mobile content stores, a method of managing data to simultaneously provide data to more users partially or through a distributed network has become more important.

SUMMARY

A distributed system environment is provided to manage various data sources and mass data as described above. The distributed system environment provides a database for storing data and has a structure in which a client accesses a server to receive data.

However, in order to make the client receive data from the server, the server accesses the database and transmits data to the client. Accordingly, if too many users simultaneously make a request for data to the server, a load of the database may become serious due to excessive access and an increase in transmitted data capacity.

Therefore, it is required to increase efficiency of data management between the server and the database and improve performance to reduce communication overhead in order to smoothly provide data to more users.

Various embodiments of the disclosure may provide a server, an electronic device, and a data management method which can provide an immediate response when an electronic device makes a request for data by storing data in advance in a cache within the server.

In accordance with an aspect of the disclosure, a server for managing data includes: communication circuitry configured to receive a request for data from at least one electronic device; a cache configured to store a plurality of updated data according to an update time; and a processor configured to, when receiving the request for data from the electronic device, perform control to search for updated data for a first period from a previous data request time to a data request reception time in the cache and transmit at least one updated data for the first period to the electronic device.

In accordance with another aspect of the disclosure, a method of managing data by a server includes: storing a plurality of updated data according to an update time in a cache within the server; receiving a request for data from at least one electronic device; when receiving the request for data from the electronic device, searching for updated data for a first period from a previous data request time to a data request reception time in the cache; and transmitting at least one updated data for the first period to the electronic device.

In accordance with another aspect of the disclosure, an electronic device includes: a communication interface configured to transmit a request for data to a server and a processor configured to, when there is updated data for a first period from a previous data request time to a data request transmission time in a cache within the server for storing a plurality of updated data according to an update time, perform control to receive at least one updated data for the first period from the server.

According to various embodiments, the server may update data in the cache according to a predetermined period and thus provide data existing in the cache when the client makes a request for data, thereby reducing an unnecessary response delay time.

According to various embodiments, even though clients make a request for data to the server, the server may provide only data corresponding to the changed part of the data within the cache to each of the clients, thereby reducing communication overhead.

According to various embodiments, when the client makes a request for data, the server may provide data existing in the cache instead of searching for the data in a database to provide the data, thereby increasing efficiency of distribution processing.

DETAILED DESCRIPTION OF THE DISCLOSURE

Figure 1:
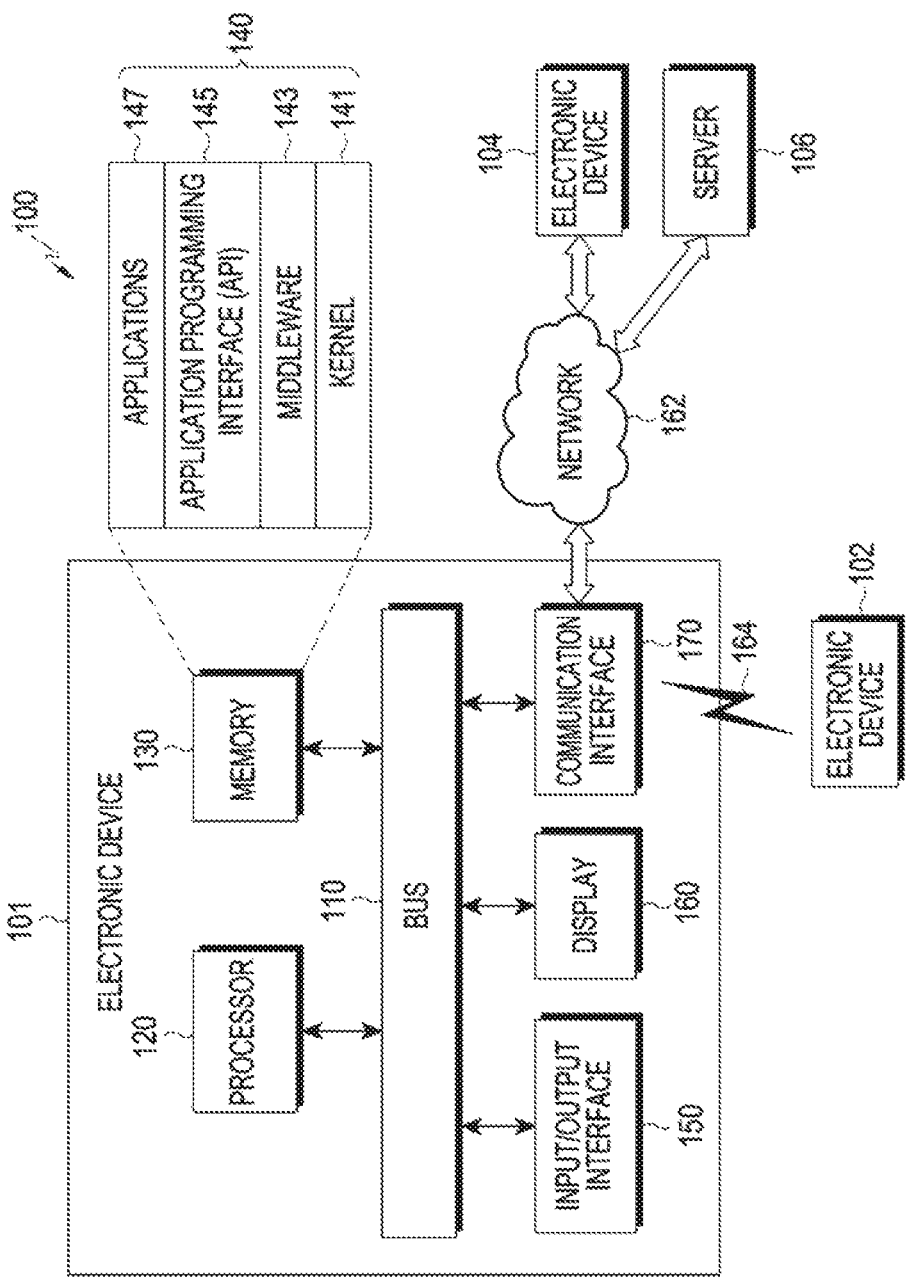
FIG. 1 illustrates an electronic device within a network environment according to various embodiments.

FIGS. 8 to 12 illustrate data exchanged according to data requests and responses between a client and a server according to various embodiments.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" may modify various components regardless of the order and/or the importance, and is used merely to distinguish one element from any other element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element). The expression "plural" may mean at least two or more.

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smart phone, a tablet personal computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a Head-Mounted Device (HMD)), a fabric or clothing integrated type (e.g., electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship or a gyro-compass), avionics, security devices, an automotive head unit, a robot for home or industry, an Automatic Teller's Machine (ATM) in banks, a Point Of Sale (POS) in a shop, or Internet device of things (e.g., a light bulb, various sensors, electric or gas meter, a sprinkler device, a fire alarm, a thermostat, a streetlamp, a toaster, sporting goods, a hot water tank, a heater, a boiler, etc.). According to some embodiments, an electronic device may include at least one of a part of a piece of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to embodiments of the disclosure is not limited to the above-described devices. In the disclosure, the term "user" may indicate a person using an electronic device or a device (e.g., an artificial intelligence electronic device) using an electronic device.

Referring to FIG. 1, the electronic device 101 of the network environment 100 may include a bus 110, a processor 120, a memory 130, an input/output interface 150, a display 160, a communication interface 170, and a global positioning system (GPS) module 190. In some embodiments, at least one of the components may be omitted, or an additional component may be further included in the electronic device 101. The bus 110 may include a circuit that connects the components 110 to 170 to each other and delivers communications (e.g., control messages or data) between the components. The processor 120 may include one or more of a central processing unit, an application processor, and a communication processor (CP). The processor 120 may control, for example, at least one different component of the electronic device 101, and/or may perform an operation relating to communication or data processing.

The memory 130 may include a volatile and/or nonvolatile memory. The memory 130 may store a command or data related to at least one different component of the electronic device 101. According to one embodiment, the memory 130 may store software and/or a program 140. The program 140 may include a kernel 141, middleware 143, an application programming interface (API) 145, and/or an application program (application) 147. At least part of the kernel 141, the middleware 143, and the API 145 may be designated as an operating system. The kernel 141 may control or manage system resources (e.g., the bus 110, the processor 120, the memory 130, or the like) used to perform an operation or function implemented in other programs (e.g., the middleware 143, the API 145, or the application program 147). The kernel 141 may provide an interface that allows the middleware 143, the API 145, or the application program 147 to access individual components of the electronic device 101 to thereby control or manage system resources.

The middleware 143 may serve as a relay so that, for example, the API 145 or the application program 147 communicates with the kernel 141 to exchange data. The middleware 143 may process one or more requests for operations received from the application program 147 according to priority. The middleware 143 may assign at least one application program 147 a priority for using a system resource (e.g., the bus 110, the processor 120, the memory 130, or the like) of the electronic device 101, and may process one or more requests for operations. The API 145 is an interface for the application 147 to control a function provided from the kernel 141 or the middleware 143, and may include, for example, at least one interface or function (e.g., a command) for file control, window control, image processing, or text control. The input/output interface 150 may deliver a command or data, which is input from a user or a different external device, to one or more different components of the electronic device 101, or may output a command or data, which is received from one or more different components of the electronic device 101, to the user or different external device.

The display 160 may include a liquid crystal display (LCD), a light-emitting diode (LED) display, an organic light-emitting diode (OLED) display, a micro-electro-mechanical Systems (MEMS) display, and an electronic paper display. The display 160 may display, for example, various types of content (e.g., text, an image, a video, an icon, a symbol, and/or the like) for the user. The display 160 may include a touch screen and may receive touch, gesture, proximity, or hovering input using, for example, an electronic pen or a body part of a user. The communication interface 170 may establish communication, for example, between the electronic device 101 and an external device (e.g., a first external electronic device 102, a second external electronic device 104, or a server 106). For example, the communication interface 170 may be connected to a network 162 or 164 via wireless communication or wired communication to communicate with the external device (e.g., the second external electronic device 104 or the server 106).

The wireless communication may include cellular communication using, for example, at least one of long-term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM). The wireless communication may include, for example, at least one of Wi-Fi, Bluetooth (BT), Bluetooth low energy (BLE), ZigBee, near field communication (NFC), magnetic secure transmission (MST), radio frequency (RF), and a body area network (BAN). The wireless communication may also include a global navigation satellite system (GNSS). The GNSS may be, for example, a GPS, a global navigation satellite system (GLONASS), a Beidou navigation satellite system ("Beidou"), or Galileo, which is the European global satellite-based navigation system. In the present document, "GPS" may be interchangeably used with "GNSS" hereinafter. The wired communication may include, for example, at least one of universal serial bus (USB), high definition multimedia interface (HDMI), recommended standard 232 (RS-232), Power Line Communication, and plain old telephone service (POTS). The network 162 may include a telecommunications network, which may be, for example, at least one of a computer network (for example, a local area network (LAN) or wide area network (WAN)), the Internet, and a telephone network.

The first and second external electronic devices 102 and 104 may each be a device of a type that is the same as, or different from, the electronic device 101. According to various embodiments, all or part of the operations performed in the electronic device 101 may be performed in another electronic device or a plurality of electronic devices (for example, the electronic devices 102 and 104 or the server 106). According to one embodiment, when the electronic device 101 needs to perform a function or service automatically or upon request, the electronic device 101 may request another electronic device (e.g., the electronic device 102 or 104, or the server 106) to perform at least some functions related to the function or service, instead of, or in addition to, autonomously performing the function or service. The other electronic device (e.g., the electronic device 102 or 104, or the server 106) may perform the requested functions or additional functions, and may transmit the result thereof to the electronic device 101. The electronic device 101 may provide the requested function or service using the same received result or by additionally processing the result. To this end, cloud-computing, distributed-computing, or client-server-computing technologies may be used.

Figure 2:
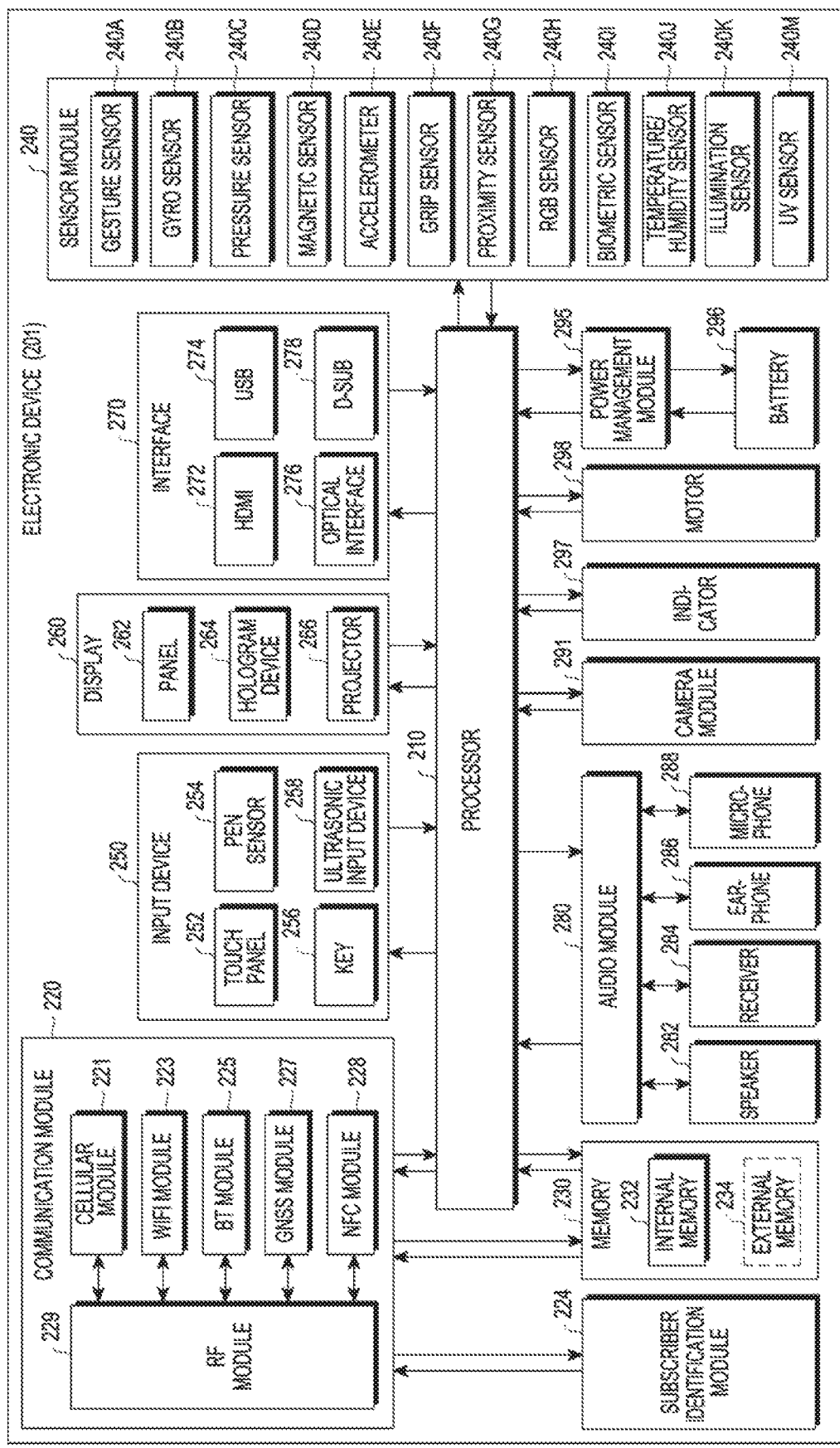
FIG. 2 is a block diagram of the electronic device according to various embodiments.

FIG. 2 is a block diagram of an electronic device according to an embodiment of the disclosure. Referring to FIG. 2, the electronic device 201 may include all or part of the electronic device 101 illustrated in FIG. 1. The electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processors 210 may run an operating system or an application program to control a plurality of hardware or software components that are connected to the processors 210, and may perform various kinds of data processing and operations. The processors 210 may be configured as a system on chip (SoC). According to one embodiment, the processors 210 may further include a graphic processing unit (GPU) and/or an image signal processor. The processors 210 may include at least some of the components illustrated in FIG. 2, such as a cellular module 221. The processors 210 may load a command or data received from at least one other component (e.g., nonvolatile memory) into volatile memory to process the command or data, and may store resultant data in the nonvolatile memory.

The communication module 220 (e.g., the communication interface 170) may include the cellular module 221, a Wi-Fi module 223, a Bluetooth module 225, a GNSS module 227, an NFC module 228, and an RF module 229. The cellular module 221 may provide, for example, a voice call, a video call, a text messaging service, or an Internet service through a communication network. According to one embodiment, the cellular module 221 may perform identification and authentication of the electronic device 201 in a communication network using the SIM (e.g. SIM card) 224. The cellular module 221 may perform at least part of the functions provided by the processors 210. The cellular module 221 may include a CP. At least two or more of the cellular module 221, the Wi-Fi module 223, the Bluetooth module 225, the GNSS module 227, and the NFC module 228 may be included in one integrated chip (IC) or IC package. The RF module 229 may transmit and receive a communication signal (e.g., an RF signal). The RF module 229 may include a transceiver, a power amplifier (amp) module (PAM), a frequency filter, a low noise amplifier (LNA), an antenna, or the like. According to another embodiment, at least one of the cellular module 221, the Wi-Fi module 223, the Bluetooth module 225, the GNSS module 227, and the NFC module 228 may transmit and receive an RF signal through a separate RF module. The SIM 224 may include a card including an SIM or an embedded SIM, and may include unique identification information (for example, an integrated circuit card identifier (ICCID)) or subscriber information (for example, an international mobile subscriber identity (IMSI)).

The memory 230 (e.g., the memory 130) may include an internal memory 232 or an external memory 234. The internal memory 232 may include, for example, at least one of a volatile memory (e.g., a dynamic random access memory (DRAM), an static RAM (SRAM), an synchronous dynamic RAM (SDRAM), or the like) and a nonvolatile memory (for example, a one-time programmable ROM (OTPROM), a PROM, an EPROM, an EEPROM, a mask ROM, a flash ROM, a flash memory, a hard drive, or a solid state drive (SSD)). The external memory 234 may include a flash drive, a compact flash (CF), a secure digital (SD) memory, a micro-SD memory, a mini-SD memory, an extreme digital (xD) memory, a multi-media card (MMC), a memory stick, or the like. The external memory 234 may be functionally or physically connected to the electronic device 201 through any of various interfaces.

The sensor module 240 may measure physical quantities, or may detect the state of operation of the electronic device 201 and convert measured or detected information into an electrical signal. The sensor module 240 may include at least one of a gesture sensor 240A, a gyro sensor 240B, a barometric pressure sensor 240C, a magnetic sensor 240D, an accelerometer 240E, a grip sensor 240F, a proximity sensor 240G, a color sensor 240H (e.g., a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one embodiment, the electronic device 201 may further include a processor configured, as part of the processors 210 or separately from the processors 210, to control the sensor module 240, thereby controlling the sensor module 240 while the processors 210 are in a sleep state.

The input device 250 may include a touch panel 252, a (digital) pen sensor 254, a key 256, or an ultrasonic input device 258. The touch panel 252 may be at least one of an electrostatic type, a pressure-sensitive type, an infrared type, and an ultrasonic type. The touch panel 252 may further include a control circuit. The touch panel 252 may further include a tactile layer to provide a user with a tactile response. The (digital) pen sensor 254 may be part of the touch panel or may include a separate recognition sheet. The key 256 may include a physical button, an optical key, or a keypad. The ultrasonic input device 258 may detect ultrasonic waves generated in an input tool through a microphone (e.g., a microphone 288) and may identify data corresponding to the detected ultrasonic waves.

The display 260 (e.g., the display 160) may include a panel 262, a hologram device 264, a projector 266, and/or a control circuit to control the panel 262, the hologram device 264, or the projector 266. The panel 262 may be configured to be flexible, transparent, or wearable. The panel 262 may be formed with the touch panel 252 in one or more modules. The panel 262 may include a pressure sensor (or force sensor) to measure the strength of pressure of a user's touch. The pressure sensor may be formed with the touch panel 252 in a single body, or may be provided as one or more sensors separate from the touch panel 252. The hologram device 264 may display a three-dimensional image in the air using the interference of light. The projector 266 may project light onto a screen to display an image. The screen may be disposed inside or outside the electronic device 201. The interface 270 may include an HDMI 272, a USB 274, an optical interface 276, or a D-subminiature (D-sub) interface 278. The interface 270 may be included, for example, in the communication interface 170 illustrated in FIG. 1. Additionally or alternatively, the interface 270 may include a mobile high-definition link (MHL) interface, an SD card/MMC interface, or an Infrared Data Association (IrDA) interface.

The audio module 280 may bi-directionally convert sound and an electrical signal. At least some components of the audio module 280 may be included, for example, in the input/output interface 150 illustrated in FIG. 1. The audio module 280 may process sound information input or output, for example, through a speaker 282, a receiver 284, earphones 286, or the microphone 288. The camera module 291 is a device that takes, for example, a still image and a video. According to one embodiment, the camera module 291 may include one or more image sensors (for example, a front sensor or a rear sensor), a lens, an image signal processor (ISP), or a flash (for example, an LED, a xenon lamp, or the like). The power management module 295 may manage, for example, the power of the electronic device 201. According to one embodiment, the power management module 295 may include a power management integrated circuit (PMIC), a charger IC, or a battery or fuel gauge. The PMIC may have wired and/or wireless charging methods. The wireless charging methods may include a magnetic-resonance method, a magnetic-induction method, or an electromagnetic-wave method. The power management module 295 may further include an additional circuit for wireless charging, such as a coil loop, a resonance circuit, or a rectifier. The battery gauge may measure, for example, the remaining battery charge, the charging voltage, the current, or the temperature of the battery 296. The battery 296 may include a rechargeable battery and/or a solar battery.

The indicator 297 may display the specific state of the electronic device 201 or a component thereof (e.g., the processors 210), which may be a booting state, a message state, or a charging state. The motor 298 may convert an electrical signal into mechanical vibrations, and may generate vibrations or a haptic effect. The electronic device 201 may include a mobile TV support device (e.g., a graphics processing unit (GPU)) that is capable of processing media data in accordance with, for example, digital multimedia broadcasting (DMB), digital video broadcasting (DVB), or MediaFlo™ standards. Each element mentioned in the present document may include one or more components, and may be designated by different terms depending on the type of electronic device. In various embodiments, an electronic device (for example, the electronic device 201) may be configured such that some components are omitted, additional components are further included, or some of the components are combined into one entity, but may perform the same functions as those of the corresponding components before combination.

Figure 3:
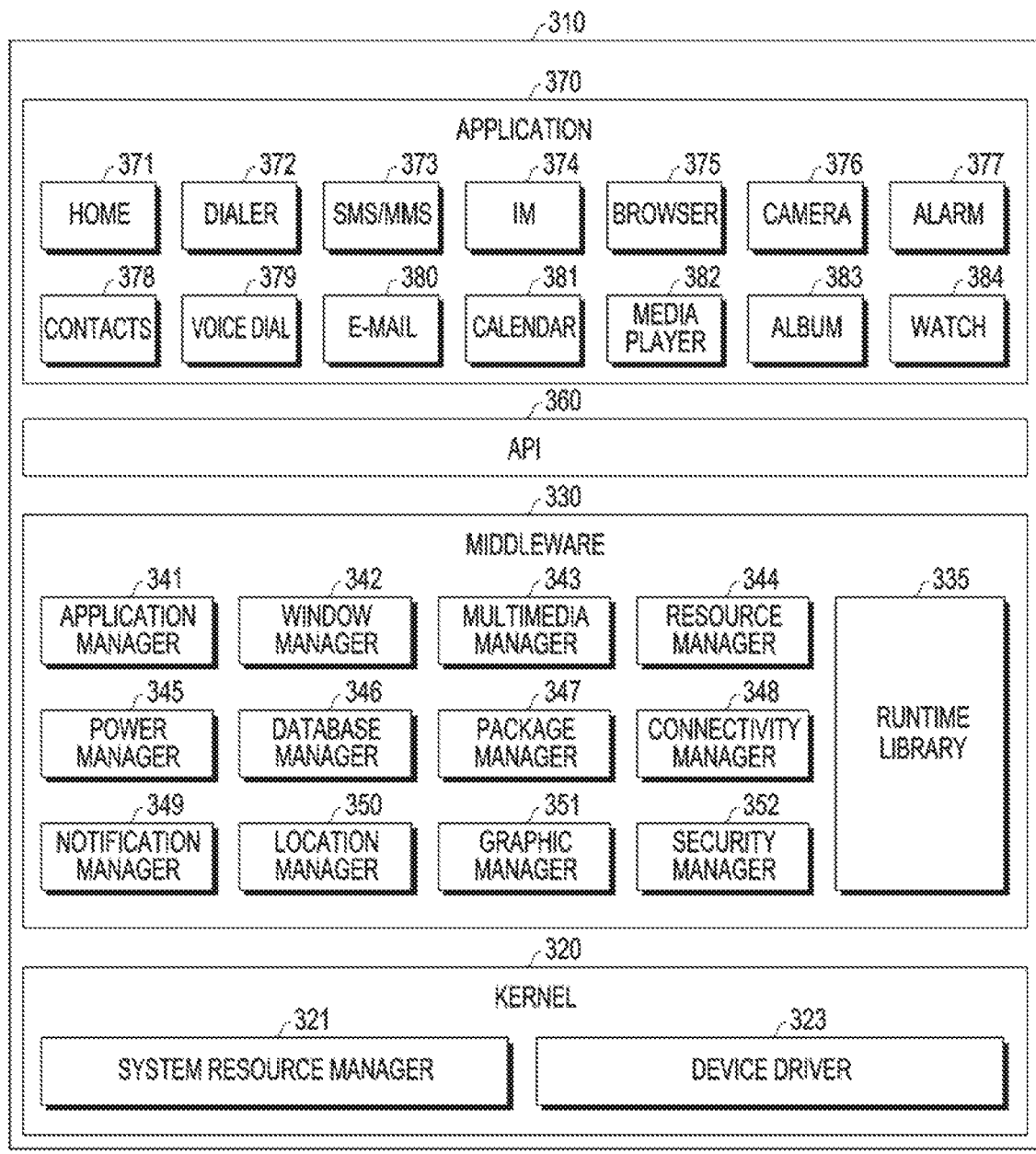
FIG. 3 is a block diagram of a program module according to various embodiments.

FIG. 3 is a block diagram of a program module according to various embodiments. According to an embodiment, the program module 310 (for example, the program 140) may include an Operating System (OS) that controls resources relating to an electronic device (for example, the electronic device 101) and/or various applications (for example, the application programs 147) that are driven on the operating system. The operating system may include, for example, Android™, iOS™, Windows™, Symbian™, Tizen™, or Bada™. Referring to FIG. 3, the program module 310 may include a kernel 320 (for example, the kernel 141), middleware 330 (for example, the middleware 143), an API 360 (for example, the API 145), and/or applications 370 (for example, the application programs 147). At least a part of the program module 310 may be preloaded on the electronic device, or may be downloaded from an external electronic device (for example, the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function required by the applications 370 in common, or may provide various functions to the applications 370 through the API 360 such that the applications 370 can efficiently use limited system resources within the electronic device. According to an embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage an input/output, manage a memory, or process an arithmetic function. The application manager 341 may manage, for example, the life cycles of the applications 370. The window manager 342 may manage GUI resources used for a screen. The multimedia manager 343 may identify formats required for reproducing various media files and may encode or decode a media file using a codec suitable for the corresponding format. The resource manager 344 may manage the source code of the applications 370 or the space in memory. The power manager 345 may manage, for example, the capacity or power of a battery and may provide power information required for operating the electronic device. According to an embodiment, the power manager 345 may operate in conjunction with a basic input/output system (BIOS). The database manager 346 may, for example, generate, search, or change databases to be used by the applications 370. The package manager 347 may manage the installation or update of an application that is distributed in the form of a package file.

The connectivity manager 348 may manage, for example, a wireless connection. The notification manager 349 may provide information on an event (for example, an arrival message, an appointment, a proximity notification, or the like) to a user. The location manager 350 may manage, for example, the location information of the electronic device. The graphic manager 351 may manage a graphic effect to be provided to a user and a user interface relating to the graphic effect. The security manager 352 may provide, for example, system security or user authentication. According to an embodiment, the middleware 330 may include a telephony manager for managing a voice or video call function of the electronic device or a middleware module that is capable of forming a combination of the functions of the above-described elements. According to an embodiment, the middleware 330 may provide specialized modules according to the types of operation systems. The middleware 330 may dynamically remove some of the existing elements, or may add new elements. The API 360 is, for example, a set of API programming functions, and may be provided with different configurations depending on the operating system. For example, in the case of Android or iOS, one API set may be provided for each platform, and in the case of Tizen, two or more API sets may be provided for each platform.

The applications 370 may include, for example, a home application 371, a dialer application 372, an SMS/MMS application 373, an Instant Message (IM) application 374, a browser application 375, a camera application 376, an alarm application 377, a contact application 378, a voice dial application 379, an e-mail application 380, a calendar application 381, a media player application 382, an album application 383, a watch application 384, a health care application (for example, measuring exercise quantity or blood sugar), or an application for providing environment information (for example, providing atmospheric pressure, humidity, and temperature information). According to an embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may perform a function (for example, a function of turning on/off an external electronic device (or some elements thereof) or controlling brightness (or resolution) of the display) of the external electronic device communicating with the electronic device or install, delete, or update an application executed by the external electronic device. According to an embodiment, the applications 370 may include applications (for example, a health care application of a mobile medical appliance) that are designated according to the attributes of an external electronic device. According to an embodiment, the applications 370 may include applications received from an external electronic device. At least some of the program module 310 may be implemented (for example, executed) by software, firmware, hardware (for example, the processor 210), or a combination of two or more thereof and may include a module, a program, a routine, an instruction set, or a process for performing one or more functions.

Figure 4:
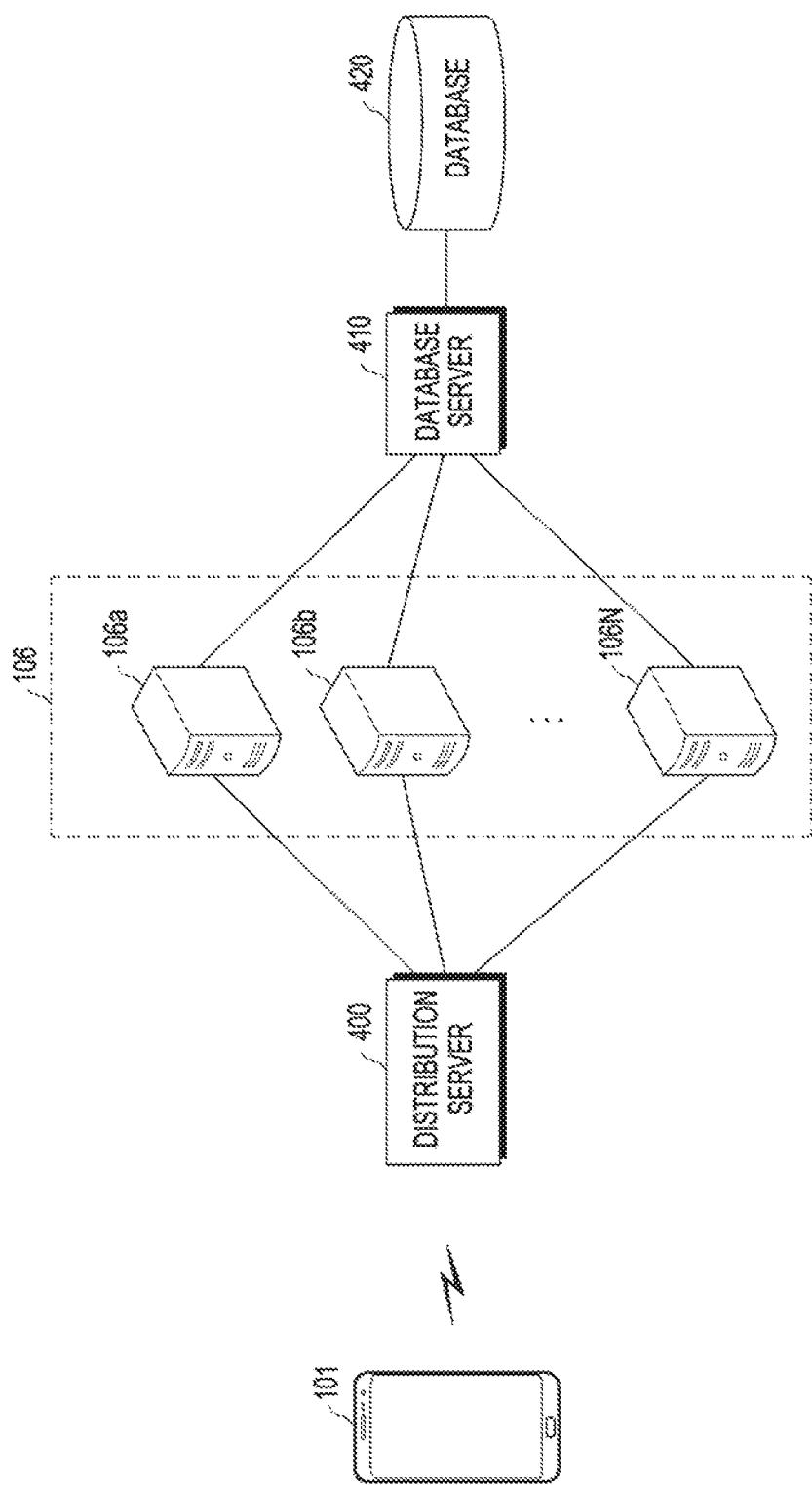
FIG. 4 schematically illustrates the configuration of a system for providing a data service in a distributed environment according to various embodiments.

FIG. 4 schematically illustrates the configuration of a system for providing a data service in a distributed environment according to various embodiments.

Referring to FIG. 4, the system for providing the data service may include at least one of the electronic device 101, a distribution server 400, the server 106, a database server 410, and a database 420. Although one or more servers 106a, 106b, . . . , 106N are illustrated in FIG. 4, the electronic device 101 may be connected to one the servers, and hereinafter the case in which a server connected to the electronic device 101 is the server 106 will be described by way of an example. Further, although FIG. 4 illustrates the case in which the server 106 is connected to the database 420 through the database server 410, the server 106 and the database 420 may be implemented to directly communicate with each other in which case the database server 420 may be omitted.

The electronic device 101 may be referred to as a client, and the client may be a user device which can access the server 106 to search for and browse required data. Further, the electronic device 101 may be referred to as a slave communicating with the server 106, and the server 106 may operate as a master.

The electronic device 101 may receive all data from the server 106 when initially accessing the server 106 and, thereafter, may receive only some of changed (or updated) data in order to reduce the packet size when receiving data from the server 106.

The electronic device 101 may receive data from the server 106 and output a screen interface visualized on the basis of the received data. For example, the electronic device 101 may quickly output various data sources and massive data stored in a cache within the server 106, such as app information of an app store, popup information or music lists of a music reproduction app (for example, Milk), notifications, event or coupon information of a pay app (for example, Samsung Pay), and white lists or black lists of a data backup app (for example, Smart Switch).

The distribution server 400 may be referred to as a central server or a load balancer, and one or more servers 106a, 106b, . . . , 106N may access the load balancer. When a plurality of electronic devices make a request for data, the distribution server 400 may serve to select a server which the plurality of electronic devices access for smooth provision of data to the plurality of electronic devices. Accordingly, whenever the electronic devices make a request for data, one service for handling the request may be selected through the load balancer.

One server 106 of the servers 106a, 106b, . . . , 106N may be connected to one electronic device 101 which made a request for data, and the server 106 may include a communication means for communicating with the electronic device 101 and a cache for storing data.

The server 106 may be a network server for receiving a query making a request for data (for example, content data or application data) from the electronic device 101 and transmitting data corresponding to the query to the electronic device 101.

In initial driving, the server 106 may make a request for all data to the database server 410 and load all data of the database 420 through the database server 410. All the loaded data may be stored in the cache within the server 106. The server 106 may manage data within the cache, merge data corresponding to an amount of data required by the electronic device 101 with the cached data, and transmit the data. According to an embodiment, the one or more servers 106a, 106b, . . . , 106N in the distributed environment may maintain and manage the same cached data. Accordingly, whichever server is accessed by the electronic device 101, the electronic device may make a request for data and receive partial data corresponding to the request, so that the server can minimize maintenance costs and the electronic device can obtain the best data response speed.

The server 106 may make a request for data updated (or data changed) in every predefined period to the database server 410 and, when there is updated data within the database 420 corresponding to the request, may receive the updated data and an update history through the database server 410. The update history may include metadata of particular data (or changed partial data or updated data). The metadata of particular data may include a previous update time (or the most recent update time or the last data change time).

The server 106 may inquire about whether there is data updated according to a predetermined period and communicate with the database server 410 to store the updated data in the cache only when there is updated data.

When there is a request for data from the electronic device 101, the server 106 may identify whether there is the requested data in the cache within the server 106. If there is the data requested by the electronic device 101 in the cache within the server 106, the data stored in the cache may be provided to the electronic device 101. For example, upon receiving an initial request for data from the electronic device 101, the server 106 may transfer all data stored in the cache to the electronic device 101. Further, upon receiving a request for updated data from the electronic device 101, the server 106 may determine whether the updated data is stored in the cache in response to the request for the updated data. If there is updated data, the server 106 may transfer the updated data to the electronic device 101.

According to an embodiment, the server 106 may use a particular time as reference information in order to provide updated data to the electronic device 101. When the particular time is the reference, the server 106 may efficiently provide changed data to a plurality of electronic devices on the basis of data stored in the cache. Accordingly, even though parts of the data requested by the plurality of electronic devices are different, the server 106 may search for data of the parts corresponding to the requests from the electronic devices on the basis of the reference information included in the requests of the electronic devices. For example, when the reference of data which the server 106 transfers to the electronic device 101 is time, the server 106 may search for and transmit only data corresponding to the reference time. The reference information for providing the updated data will be described below in detail.

As described above, when there is the data requested by the electronic device 101 in the cache within the server 106, the server 106 does not need to access the database 420 through the database server 410. Accordingly, the server 106 uses the internal cache and thus does not need to access the database server 410 in response to many requests from a plurality of electronic devices, so that the distributed environment is not influenced by the number of clients using the data service.

Further, regardless of the increase in the number of clients using the data service, the server 106 may inquire the database 420 every period and receive changed data, thereby reducing a load of the database. In addition, the server 106 may load changed data from the database every period and store the changed data in the cache, so that communication overhead between the server 106 and the database 420 may be reduced.

The database server 410 may store data and metadata to be transferred to the electronic device in the database 420 and manage the data and the metadata. The database server 410 may search the database 420 in response to the request for data from the server 106 and provide data corresponding to the request.

Figure 5:
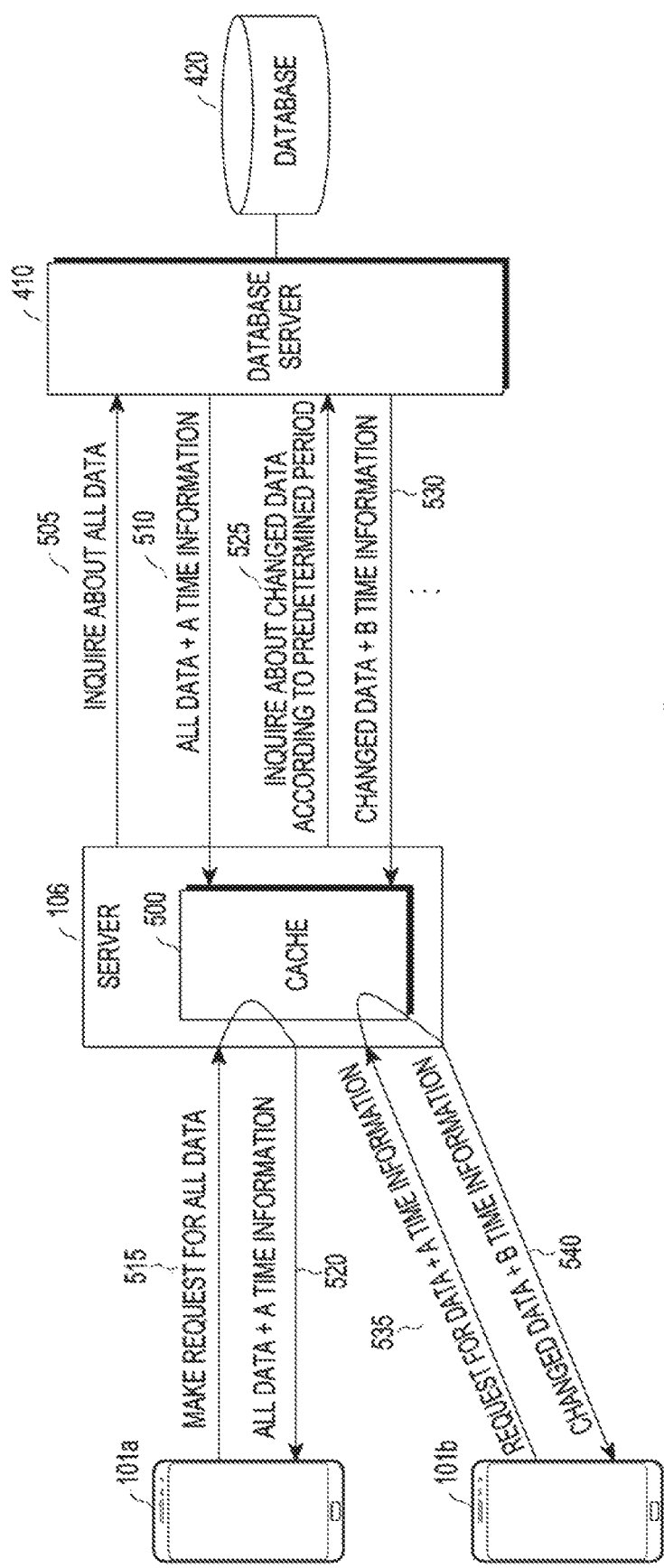
FIG. 5 briefly illustrates a data request and response process in a system for providing a data service according to various embodiments.

FIG. 5 briefly illustrates a data request and response process in a system for providing a data service according to various embodiments.

Referring to FIG. 5, it is illustrated that the server 106 includes a cache 500 therein for convenience of description, but this is only an example, and the server 106 may include a communication unit (not shown) (e.g., communication circuitry) for communicating with at least one electronic device 101 and a processor or a controller (not shown) for controlling each element within the server 106 and may be implemented through a combination of the elements and other elements. A function of providing the data service may be provided by software and stored in a memory of the server 106, and also may be performed by being loaded by a processor such as a Central Processing Unit (CPU) or a Graphic Processing Unit (GPU).

As illustrated in FIG. 5, the server 106 may include the cache 500 therein and the cache 500 may be implemented as a local memory. The cache 500 is an element for storing data received from the database 420 through the database server 410 as described below. At this time, the database server 410 can be omitted, and the server 106 may directly access the database 420 and load the data.

In order to maintain the latest data, the server 106 may load data from the database 420 through the database server 410 according to a preset update period and store the data in the cache 500. When initially accessing the database 420, the server 106 may transmit a query corresponding to the request for all data in operation 505. In response thereto, the server 106 may receive all data and A time information together in operation 510 and store the same in the cache 500. A time information is time information for the data changed last among all the data and may include, for example, a timestamp.

Thereafter, the server 106 may transmit a query corresponding to a request for changed data in a predetermined period in operation 525. Even though the server 106 transmitted the query corresponding to the request for changed data in a predetermined period, the server 106 may acquire the changed data and B time information together in operation 530 only when the changed data actually exists in the database 420. B time information acquired together with the changed data may be stored in the cache 500 within the server 106. B time information is time information for the data changed last in the latest period and may include, for example, a timestamp.

Meanwhile, one or more electronic devices 101a and 101b may access the server 106 and data parts requested by the electronic devices 101a and 101b may be different from each other.

The electronic device 101a may make a request for all data to the server 106 in operation 515. In response to the request for all data, the server 106 may transmit all data stored in the cache 500 and A time information together in operation 520. The server 106 may receive the request for all data from other electronic devices as well as the electronic device 101a and thus, whenever the request for all data is received, may provide all the latest data based on a time point at which each request is received. Accordingly, based on the time at which the request for all data is received from the electronic device 101a, the server 106 may transmit all data and data changed after A time, along with B time information indicating a time point at which data changed last.

For example, when A time at which the server 106 loads all data from the database 420 is 10 o'clock in operation 510 and a time at which the request for all data is received is 10:25 in the state in which the data stored in the cache 500 is updated in units of 10 minutes, the server 106 may search for the latest data based on a time at which a request for all data is received. Accordingly, the server 106 may provide all data stored in the cache 500 at 10 o'clock and the updated data in the cache 500 between 10 o'clock and 10:20 together to the electronic device 101a making the request for data. That is, the server 106 may transfer all data, the data updated for 20 minutes, and the last update time information (for example, 10:20) together to the electronic device 101a.

Upon receiving the request for data and A time information together from the electronic device 101b in operation 535, the server 106 may determine that the electronic device 101b is the electronic device 101b already having all data on the basis of A time information. Accordingly, the server 106 may search for data corresponding to changed parts after the time included in A time information in the cache 500 and transfer the changed data and B time information together to the electronic device 101b in operation 540.

According to various embodiments, the server 106 may include a communication unit (not shown) configured to receive a request for data from at least one electronic device 101, the cache 500 configured to store a plurality of updated data according to an update time, and a processor (not shown) configured to, when receiving the request for data from the electronic device 101, perform control to search for updated data for a first period from a previous data request time to a data request reception time in the cache 500 and transmit at least one updated data for the first period to the electronic device 101.

According to an embodiment, the received request for data may include time information related to previously updated data, and the time information may include a timestamp for data updated last among the previously updated data.

According to an embodiment, the processor may identify whether there is updated data in the database 420 according to a preset update period and, when there is the updated data, store the updated data from the database 420 in the cache 500. According to an embodiment, when there is at least one updated data found according to the preset update period, the processor may store the at least one found updated data and time information related to the at least one found updated data together in the cache 500.

According to an embodiment, when at least one updated data for the first period is transmitted to the electronic device 101, the processor may perform control to also transmit time information of data updated last among the at least one updated data to the electronic device 101.

According to an embodiment, when initially accessing the database 420, the processor may store all data from the database 420 and time information of all data together in the cache 500.

According to an embodiment, when receiving the request for data from the electronic device 101, if time information included in the request for data is time information indicating initial access, the processor may perform control to transmit all data stored in the cache 500 and the time information for all data to the electronic device 101.

According to an embodiment, the electronic device 101 may include a communication interface (for example, the communication interface 170) configured to transmit a request for data to the server 106, and a processor (for example, the processor 120) configured to, when there is updated data for a first period from a previous data request time to a data request transmission time in the cache 500 within the server 106 for storing a plurality of updated data according to an update time, perform control to receive at least one updated data for the first period from the server 106. The received request for data may include time information related to previously updated data, and the time information may include a timestamp for data updated last among the previously updated data.

According to an embodiment, the processor of the electronic device 101 may perform control to receive the at least one updated data for the first period and time information of data updated last among the at least one updated data together.

According to an embodiment, when a request for data including time information indicating initial access is transmitted to the server 106, the processor of the electronic device 101 may perform control to receive all data stored in the cache 500 and time information of all data together.

For example, when the electronic device 101 makes a request for data at 3:53, the processor of the server 106 may provide the electronic device 101 with at least one data updated for a first period (for example, from 3:17 to 3:53) from a previous data request time (for example, 3:17) to a data request reception time. At this time, the processor of the server 106 may identify whether there is updated data in the database 420 in a preset update period (for example, every 10 minutes). For example, the processor of the server 106 may identify whether there is updated data in a period of 10 minutes such as, 3 o'clock, 3:10, 3:20, 3:30, 3:40, and 3:50.

If there is updated data between 3 o'clock and 3:10, the electronic device 101 may have data updated until 3:10. Accordingly, the electronic device 101 may transmit a request for data including time information of the data updated until 3:10 to the server 106. The server 106 may provide the electronic device 101 with at least one updated data which has been updated between 3:20 and 3:50 on the basis of time information related to previously updated data, that is, time information of 3:10 which is a timestamp for the data updated last.

For example, when the server identifies whether there is updated data between 3:20 and 3:50 and there is updated data only at 3:20 and 3:50, the updated data, that is, data updated at 3:20 and data updated at 3:50 may be stored in the cache 500. Accordingly, at least one updated data for the first period provided to the electronic device 101 may include the data updated at 3:20 and the data updated at 3:50. At this time, time information (for example, 3:50) for the data updated last (for example, the data updated at 3:50) among the at least one updated data (for example, the data updated at 3:20 and the data updated at 3:50) may be also provided to the electronic device 101. A detailed description of the updated data will be made below with reference to FIGS. 8 to 12.

Figure 6:
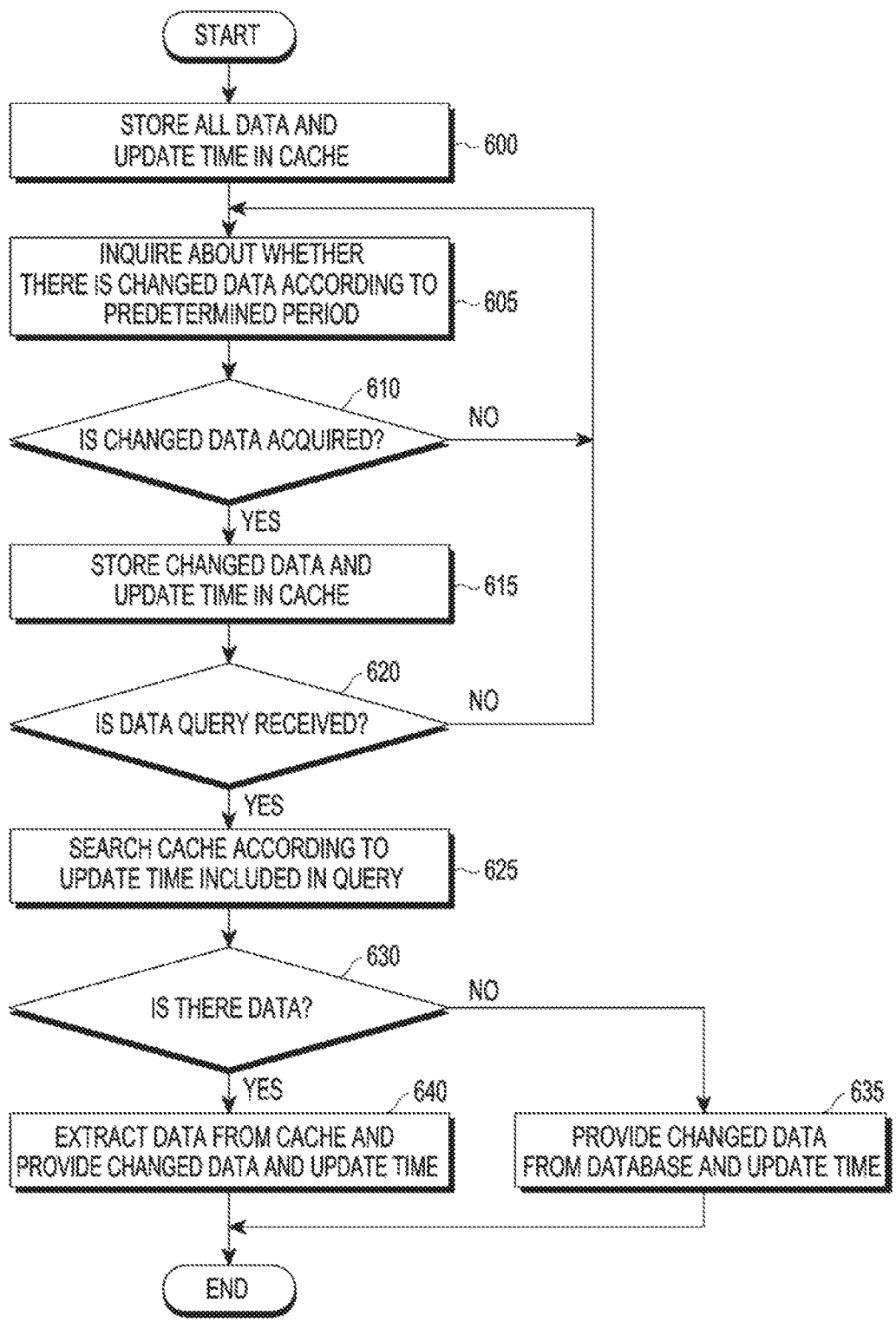
FIG. 6 is a flowchart illustrating the operation of a method of providing data by a server according to various embodiments.

FIG. 6 is a flowchart illustrating the operation of a method of providing data by the server according to various embodiments.

Referring to FIG. 6, the server 106 may load all data from the database 420, store all data, and update a time in the cache 500 in operation 600. Subsequently, the server may inquire about whether there is changed data according to a preset period in operation 605. If changed data is acquired from the database 420 in operation 610, the changed data and the update time may be stored in the cache 500 in operation 615.

When a data query is received from the electronic device 101 in operation 620, the cache 500 may be searched according to the update time included in the query in operation 625. It may be determined whether there is data corresponding to the update data in the cache 500 in operation 630, and when there is data corresponding to the update time in the cache 500, the data corresponding to the update time may be extracted from the cache 500 and then the changed data and the update time may be provided together to the electronic device 101 making the request for data in operation 640. On the other hand, when there is no data corresponding to the update time in the cache 500 in operation 630, the server 106 may receive the changed data from the database 420 and provide the changed data and the update time together to the electronic device 101 in operation 635.

According to various embodiments, the server may perform an operation of storing a plurality of updated data according to an update time in a cache within the server, an operation of receiving a request for data from at least one electronic device, an operation of, when receiving the request for data from the electronic device, searching for updated data for a first period from a previous data request time to a data request reception time in the cache, and an operation of transmitting at least one updated data for the first period to the electronic device. According to an embodiment, the received request for data may include time information related to previous updated data, and the time information may include a timestamp for data updated last among the previous updated data.

According to an embodiment, the operation of transmitting the at least one updated data for the first period to the electronic device may include also transmitting time information of data updated last among the at least one updated data to the electronic device.

According to an embodiment, the server may perform an operation of identifying whether there is the updated data in the database according to a preset update period, and an operation of, when there is at least one updated data found according to the preset update period, storing the at least one found updated data and time information related to the at least one found updated data together in the cache.

According to an embodiment, the server may perform an operation of, when initially accessing a database, storing all data from the database and time information of all data together in the cache.

According to an embodiment, the server may further perform an operation of, when time information included in the request for data is time information indicating initial access, transmitting all data stored in the cache and the time information of all data together to the electronic device.

Figure 7:
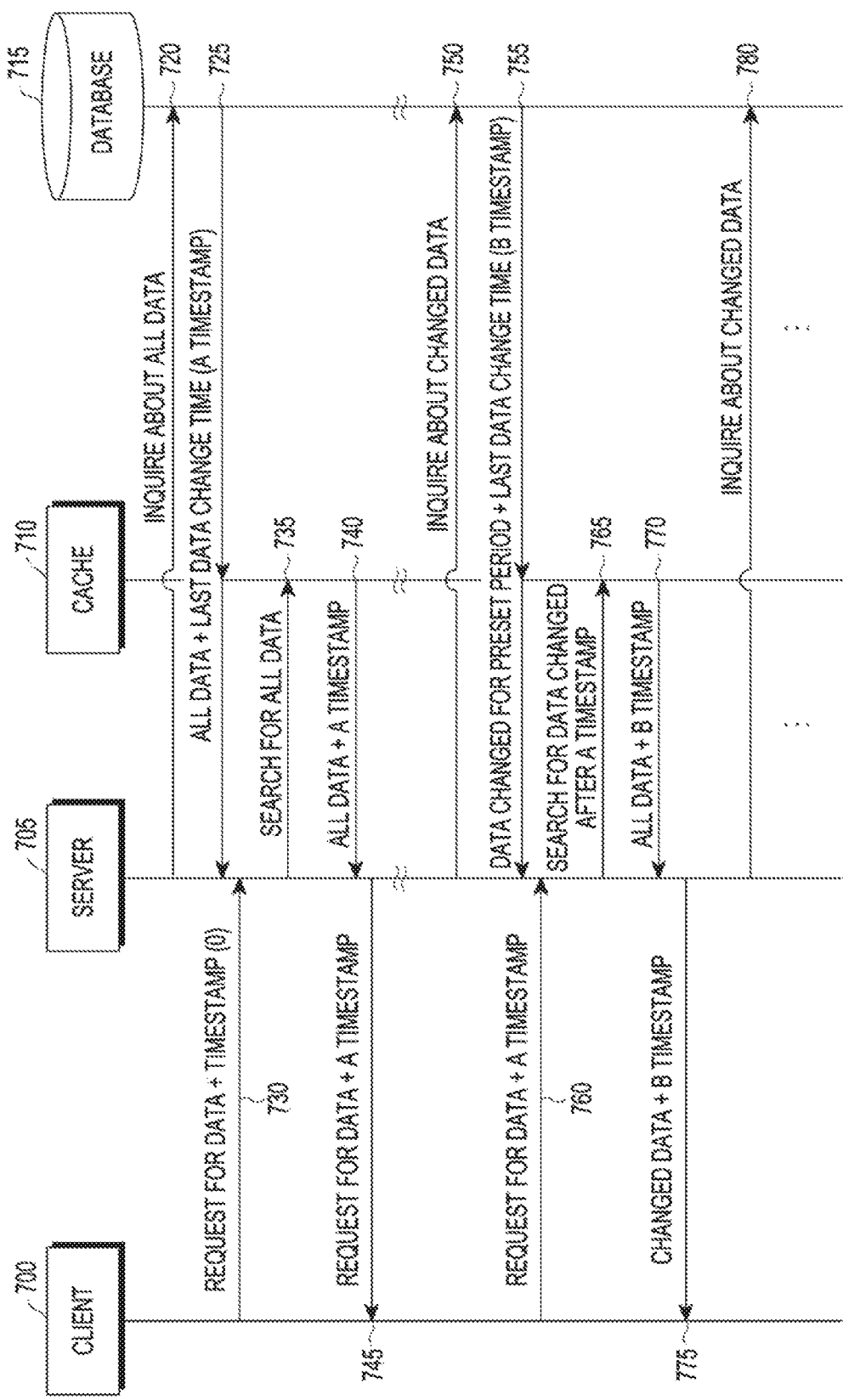
FIG. 7 illustrates flow of messages transmitted and received between elements of a system for providing a data service according to various embodiments.

FIG. 7 illustrates flow of messages transmitted/received between elements of a system for providing a data service according to various embodiments. A detailed description of data exchanged in FIG. 7 will be made with reference to FIGS. 8 to 12. FIGS. 8 to 12 illustrate data exchanged according to data requests and responses between the client and the server according to various embodiments.

Referring to FIG. 7, a server 705 may inquire about all data to a database 715 in operation 720, and may receive all data and a last data change time together and store the same in a cache 710 in operation 725. The last data change time is the latest update time of data which is updated last among all the data and may include a timestamp. As described above, in initial access, the server 700 may receive all data from the database 715, and more specifically, may receive all data together with time information of all data, that is, update time information of the data updated last and store the same in the cache 170.

Figure 8:
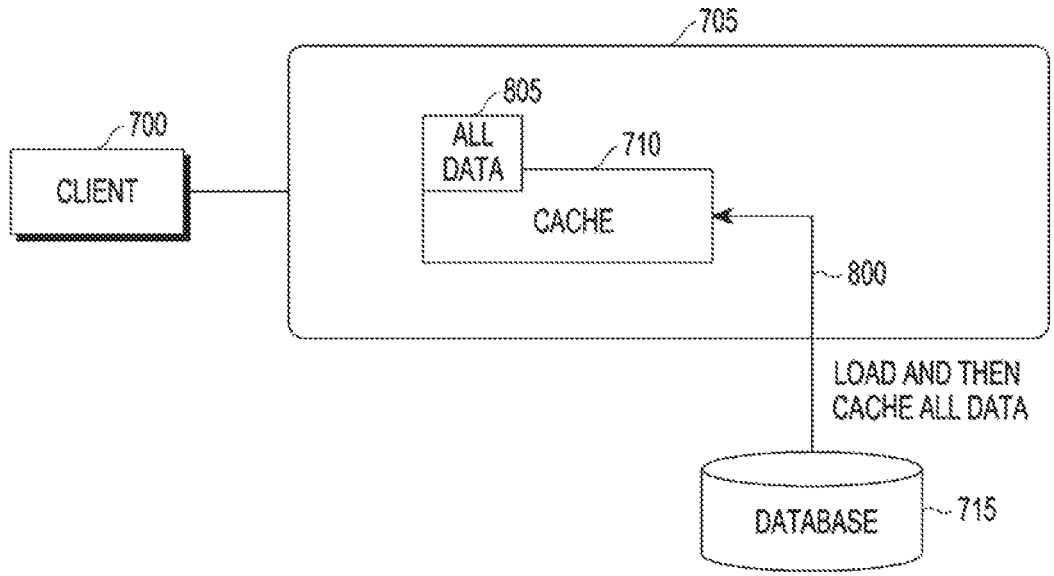

Referring to FIG. 8, in initial access, the server 705 may load all data from the database 715 and then store 800 all data in the cache 710, and accordingly the cache 710 may store all data 805. At this time, time information for the last data among all data provided from the database 715 may be stored in the cache 710 together with all data 805.

Meanwhile, in initial driving (or initial access), a client 700 may transmit the data request together with time information indicating initial access to the server 705 in operation 730. For example, the time information indicating initial access may have a timestamp having a value of 0. The server 705 may recognize the client which initially accesses on the basis of time information included in the request for data and accordingly determine that the request for data from the client 700 is a request for all data in operation 735.

The server 705 may search for all data in the cache 710 in operation 735 in response to the request for data and read time information (for example, timestamp A) for all data together with all data in operation 740. If there is all data corresponding to the request for all data from the client 700 within the cache 710, the server may transmit all data and time information (for example, timestamp A) for all data together to the client 700 in operation 745.

Meanwhile, when a preset update period arrives, the server 705 may inquire about whether there is changed data to the database 715 in operation 750. The query about whether there is changed data may be performed repeatedly whenever the preset update period arrives.

When there is changed data in response to the query about whether there is changed data, the server 705 may receive changed data for a preset period together with a last data change time (for example, timestamp B) and store the same in the cache 710 in operation 755. As described above, the server 705 may update data within the cache 710 according to the preset update period in the cache 710 regardless of the request for data from the client 700. Accordingly, a plurality of update data according to the update time may be stored within the cache 710.

Figure 9:
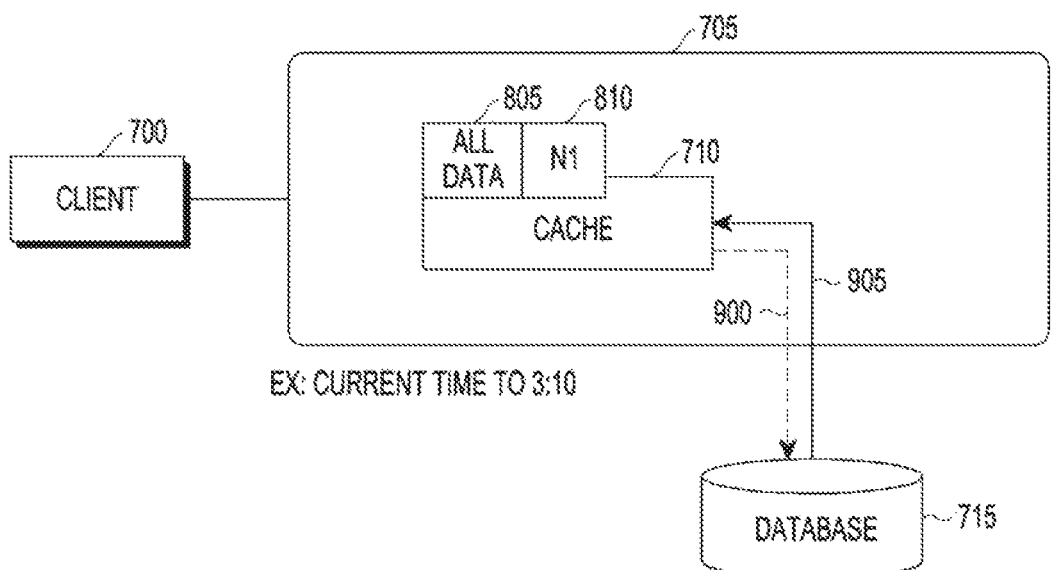

As illustrated in FIG. 9, the server 705 may inquire about whether there is updated data in the database 715 according to a preset update period (for example, a period of every 10 minutes) in operation 900. For example, when the server 705 inquires about updated data in units of 10 minutes, based on assumption that the current time is 3:10 and the update period starts at 3 o'clock, the server 705 may determine that the update period arrives if it is 3:10. When there is updated data between 3:00 and 3:10, the server 705 may store updated data (for example, N1 810) for the update period (for example, from 3:00 to 3:10) in the cache 710 in operation 905. At this time, time information (or timestamp) for the updated data may be also stored in the cache 710 together with the updated data (for example, N1 810). For example, the updated data (for example, N1 810) and the time information (for example, 3:10) for the updated data (for example, N1 810) may be cached together. The time information for the updated data is time information which can be shared by a plurality of servers and may be, for example, the last change time of the data, that is, time in units of 10 minutes.

When changed data is needed or when the update of previous data is needed, the client 700 may transmit a request for data to the server 705 in operation 760. At this time, the request for data may include time information (for example, timestamp A) for previous updated data to receive only data on the changed part.

The server 705 may search for data within the cache 710 on the basis of time information included in the request for data when receiving the request for data from the client 700. The server 705 may search for updated data after the time at which previous data is requested, that is, changed data after timestamp A in the cache 710 in operation 765. Subsequently, when there is changed data within the cache 710, the server 705 may extract the changed data and time information (for example, timestamp B) for the changed data together in operation 770. Accordingly, the server 705 may transfer the changed data and the time information (for example, timestamp B) for the changed data together to the client 700 in operation 775. As described above, the server 705 may merge cached data transmitted by the client 700 after the time (for example, timestamp A) and transfer the time at which the cached data is changed last.

Figure 10:
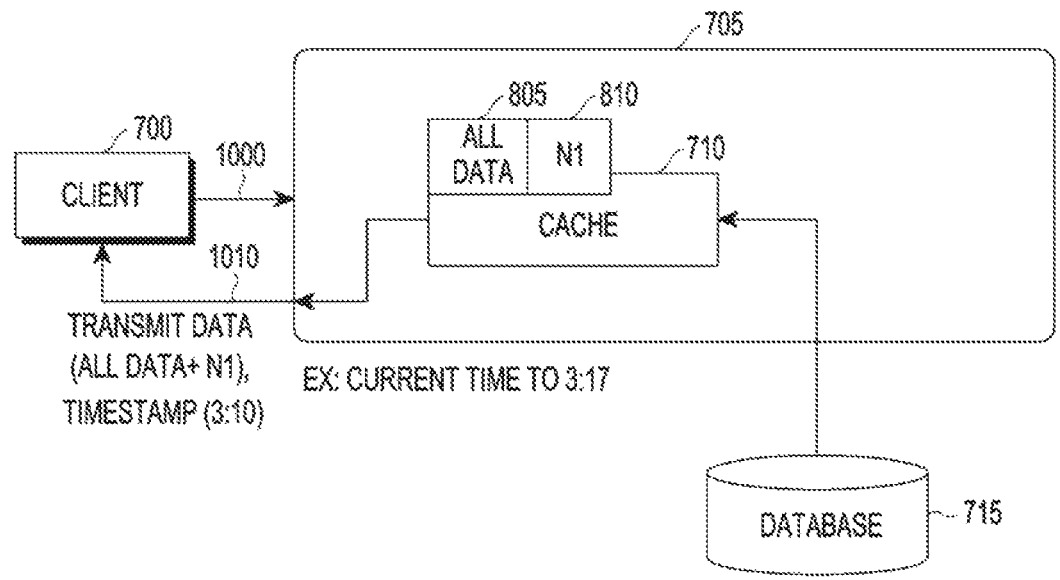

FIG. 10 illustrates the case in which all data 805, time information for all data 805, updated data (for example, N1 810), and time information (or timestamp) for the updated data are stored together in the cache 710 within the server 705.

As illustrated in FIG. 10, when a request for data is received from the client 700 in operation 1000, the server 705 may include time information related to previous updated data. On the other hand, in the case of a request for data from the client 700 according to initial driving, time information (for example, a timestamp having a value of 0) indicating initial access may be included in the request for data. Accordingly, if it is determined that the request for data is an initial data request and the current time is 3:17, the server 705 may transfer all data based on the current time stored in the cache 710 to the client 700 in operation 1010. For example, since the current time is 3:17 which is before the next update period (for example, 3:20), the server 705 may transmit all data 805, the updated data (for example, N1 810), and time information (timestamp indicating 3:10) of the updated data (for example, N1 810) together.

If a preset update period arrives while providing the changed data to the client 700, the server 705 may transmit a query for identifying whether there is changed data to the database 715 in operation 780.

Figure 11:
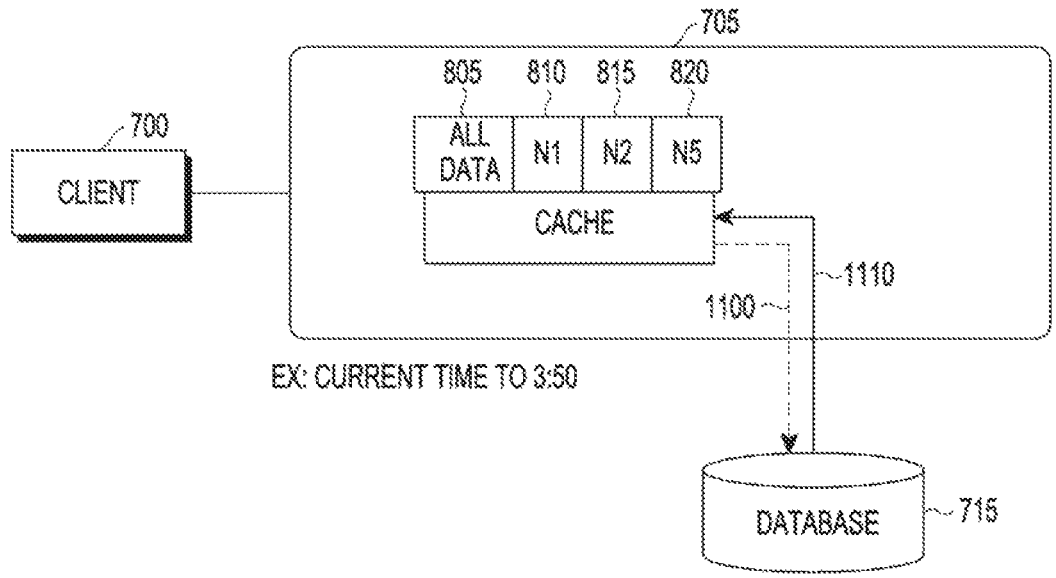

Referring to FIG. 11, the server 705 may search the database 715 whenever the preset update period arrives in operation 1100 and may load updated data during the update period from the database 715 and store the updated data in the cache 710 in operation 1110. For example, if the current time is 3:50, the server 705 may identify whether there is updated data according to a period of 10 minutes such as 3:20, 3:30, 3:40, and 3:50.

If there is updated data (or changed data) between 3:10 and 3:20, the server 705 may store updated data (for example, N2 815) during the update period (for example, from 3:10 to 3:20) in the cache 710. Similar to this, if the next update period arrives and there is no updated data during the next update period (for example, from 3:30 to 3:40) through the search in the database 715, no data may be provided from the database 715. On the other hand, when there is updated data (for example, N5 820) during the update period (for example, from 3:40 to 3:50), the updated data (for example, N5 820) may be stored in the cache 710.

Figure 12:
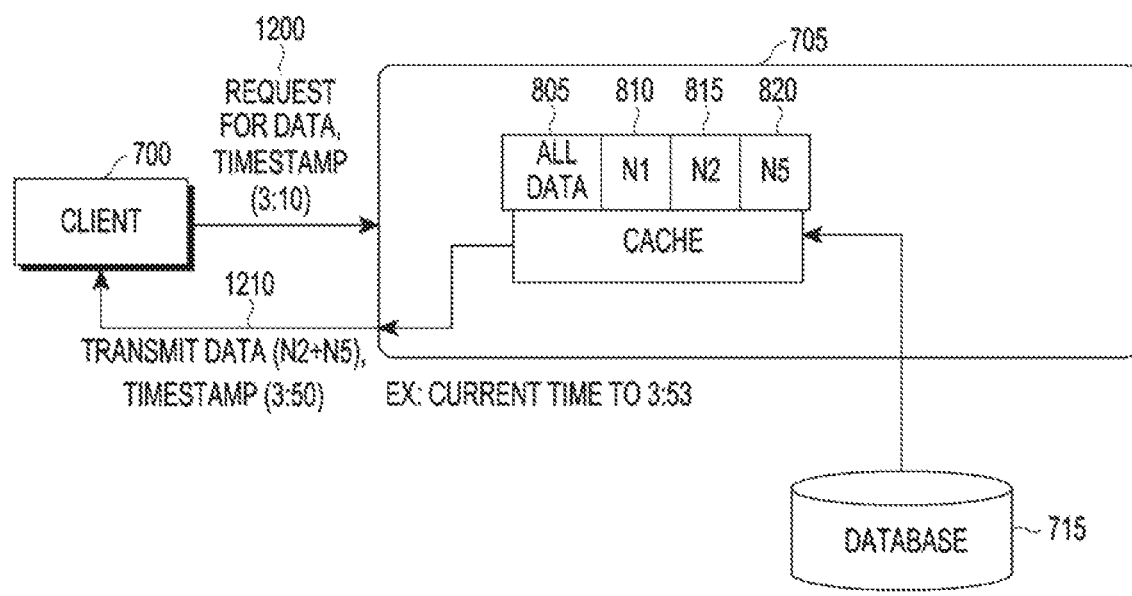

Thereafter, when a request for data including time information corresponding to a timestamp of 3:10 is received from the client 700 in operation 1200 as illustrated in FIG. 12, the server 705 may provide at least one data changed after the timestamp to the client 700 in operation 1210. For example, if the current time at which the request for data is received is 3:53, the client 700 may receive data changed after the previous timestamp of 3:10 stored in the cache 710 within the server 705, that is, updated data (for example, N2

815) and updated data (for example, N5 820). At this time, the server 705 may provide time information corresponding to the timestamp of 3:50 for the data updated last (for example, N5 820) to the client 700.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or is to be developed in the future, for performing certain operations.

At least some of devices (e.g., modules or functions thereof) or methods (e.g., operations) according to various embodiments may be implemented by an instruction which is stored in a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter.

The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

According to various embodiments, a storage medium storing instructions is provided. The instructions may be configured to cause at least one processor to perform at least one operation when executed by the at least one processor. The at least one operation may include an operation of storing a plurality of updated data according to an update time in a cache within the server, an operation of receiving a request for data from at least one electronic device, an operation of, when receiving the request for data from the electronic device, searching for updated data after a previous data request time in the cache, and an operation of transmitting at least one updated data after the previous data request time to the electronic device.

Various embodiments disclosed herein are provided merely to easily describe technical details of the disclosure and to help the understanding of the disclosure, and are not intended to limit the scope of the disclosure. Accordingly, the scope of the disclosure should be construed as including all modifications or various other embodiments based on the technical idea of the disclosure.

The invention claimed is:

1. A server for managing data, the server comprising:
communication circuitry;
a cache configured to store a plurality of updated data corresponding to a plurality of update time points; and
a processor configured to:
receive, from an electronic device, a request for data including an update time point, in response to receiving the request, identify, from among the plurality of update time points, one or more update time points subsequent to the update time point in the request,
identify whether there is data corresponding to the update time point in the request in the cache,
in response to identifying that there is no data corresponding to the update time point in the cache, receive updated data corresponding to the update time point from a database and transmit the updated data including time information indicating a time point at which data was last updated in the database to the electronic device through the communication circuitry,
in response to identifying that there is the data corresponding to the update time point in the cache, identify, from among the plurality of updated data in the cache, one or more updated data corresponding to the one or more update time points subsequent to the update time point; and
transmit the one or more updated data to the electronic device through the communication circuitry,
identify whether there is updated data corresponding to time information as measured by timestamps for when data was last updated in the database, and
in response to identifying that there is updated data corresponding to the time information as measured by the timestamps for when data was last updated in the database, store the updated data from the database into the cache.

2. The server of claim 1, wherein the processor is configured to identify whether there is updated data in the database according to a preset update period and,
when there is the updated data, store the updated data from the database in the cache.

3. The server of claim 2, wherein, if there is at least one updated data searched according to the preset update period, when storing the searched at least one updated data in the cache, the processor is configured to store at least one update time point related to the identified one or more updated data.

4. The server of claim 1, wherein, when initially accessing a database, the processor is configured to store all data from the database and an update time point of all data together in the cache.

5. The server of claim 4, wherein, when receiving the request for data from the electronic device, if the update time point included in the request for data is time information indicating initial access, the processor is configured to control to transmit all data stored in the cache and the update time point for all data to the electronic device.

6. The server of claim 1, wherein the update time point includes a timestamp for data updated last among previously updated data.

7. The server of claim 1, wherein, when the one or more updated data is transmitted to the electronic device, the processor is configured to control to transmit an update time point of data updated last among the one or more updated data to the electronic device.

8. A method of managing data by a server, the method comprising:
storing a plurality of updated data corresponding to a plurality of update time points in a cache within the server;
receiving a request for data including an update time point from an electronic device;

in response to receiving the request, identifying, from among the plurality of update time points, one or more update time points subsequent to the update time point in the request;

identifying whether there is data corresponding to the update time point in the request in the cache;

in response to identifying that there is no data corresponding to the update time point in the cache, receiving updated data corresponding to the update time point from a database and transmitting the updated data including time information indicating a time point at which data was last updated in the database to the electronic device;

in response to identifying that there is the data corresponding to the update time point in the cache, identifying, from among the plurality of updated data in the cache, one or more updated data corresponding to the one or more update time points subsequent to the update time point; and transmitting the one or more updated data to the electronic device;

identifying whether there is updated data corresponding to time information as measured by timestamps for when data was last updated in the database; and in response to identifying that there is updated data corresponding to the time information as measured by the timestamps for when data was last updated in the database, storing the updated data from the database into the cache.

9. The method of claim 8, further comprising, when initially accessing a database, storing all data from the database and an update time point of all data together in the cache.

10. The method of claim 9, further comprising, when the update time point included in the request for data is time information indicating initial access, transmitting all data stored in the cache and the update time point of all data together to the electronic device.

11. The method of claim 8, wherein the update time point includes a timestamp for data updated last among previous updated data.

12. The method of claim 8, wherein the transmitting of the one or more updated data to the electronic device comprises transmitting an update time point of data updated last among the one or more updated data to the electronic device.

13. The method of claim 8, further comprising identifying whether there is the updated data in a database according to a preset update period; and if there is at least one updated data searched according to the preset update period, when storing the searched at least one updated data in the cache, storing at least one update time point related to the searched at least one updated data.

14. An electronic device comprising:

communication circuitry; and a processor configured to:

transmit a request for data including an update time point to a server, wherein the update time point represents a time subsequent to when data was last received from the server, and includes a timestamp for data updated last among previously updated data and in response to the transmitting of the request, receive, from among a plurality of updated data in a cache of the server, one or more updated data corresponding to one or more update time points subsequent to the update time point in the request from the server, wherein the plurality of updated data corresponding to a plurality of update time points is stored in cache within in the server, wherein when there is no data corresponding to the update time point in the cache, the processor is further configured to receive updated data corresponding to the update time point from a database through the server, wherein the server identifies the updated data corresponding to time information as measured by timestamps for when data was last updated in the database, and wherein the updated data includes the time information indicating a time point at which data was last updated in the database.

15. The electronic device of claim 14, wherein, when receiving the one or more updated data, the processor is configured to control to receive update time point of data updated last among the one or more updated data.

16. The electronic device of claim 14, wherein, when the second request for data including update time point indicating initial access is transmitted to the server, the processor is configured to control to receive all data stored in the cache and an update time point of all data together from the server.

* * * * *